United States Patent
Austin

(10) Patent No.: US 10,791,108 B2
(45) Date of Patent: Sep. 29, 2020

(54) APPARATUSES, SYSTEMS AND METHODS FOR TRACKING NETWORK CONNECTED DEVICES

(71) Applicant: Joseph Jay Austin, San Diego, CA (US)

(72) Inventor: Joseph Jay Austin, San Diego, CA (US)

( * ) Notice: Subject to any disclaimer, the term of this patent is extended or adjusted under 35 U.S.C. 154(b) by 0 days.

(21) Appl. No.: 15/725,262

(22) Filed: Oct. 4, 2017

(65) Prior Publication Data

US 2018/0097799 A1    Apr. 5, 2018

Related U.S. Application Data

(60) Provisional application No. 62/458,508, filed on Feb. 13, 2017, provisional application No. 62/403,750, filed on Oct. 4, 2016.

(51) Int. Cl.
*H04L 29/06* (2006.01)
*H04L 29/08* (2006.01)
*H04W 4/90* (2018.01)

(52) U.S. Cl.
CPC ...... *H04L 63/0807* (2013.01); *H04L 63/0853* (2013.01); *H04L 63/0876* (2013.01); *H04L 67/22* (2013.01); *H04W 4/90* (2018.02)

(58) Field of Classification Search
CPC . H04L 63/0807; H04L 67/22; H04L 63/0876; H04L 63/0853; H04W 4/90
See application file for complete search history.

(56) References Cited

U.S. PATENT DOCUMENTS

| | | | | |
|---|---|---|---|---|
| 10,412,052 | B2* | 9/2019 | Bone | G06F 9/4401 |
| 2014/0181994 | A1* | 6/2014 | Vignocchi | A63F 13/95 |
| | | | | 726/28 |
| 2016/0012424 | A1* | 1/2016 | Simon | G06Q 30/0226 |
| | | | | 705/67 |
| 2016/0248864 | A1* | 8/2016 | Loia | G06Q 50/01 |
| 2017/0018001 | A1* | 1/2017 | Tunnell | H04L 67/306 |
| 2017/0046709 | A1* | 2/2017 | Lee | G06Q 20/0655 |
| 2017/0085555 | A1* | 3/2017 | Bisikalo | G06F 16/9535 |
| 2017/0091721 | A1* | 3/2017 | Ronca | G06Q 20/065 |
| 2017/0149775 | A1* | 5/2017 | Bachar | H04L 67/303 |
| 2017/0366394 | A1* | 12/2017 | Kurian | G06Q 10/0631 |

* cited by examiner

*Primary Examiner* — Cheng-Feng Huang
(74) *Attorney, Agent, or Firm* — Michael P. Eddy

(57) ABSTRACT

Apparatuses, systems and methods for tracking network connected devices includes the steps of determining whether a device is associated with an identifier. If the device does have an identifier, determining whether the identifier is associated with the device and if the device does not already have an identifier, associating an identifier with the device. Next, an amount of tokens is assigned to the device and its associated identifier. The last step determines an accounting of the tokens associated with the device. Other steps that may be included are the steps of determining whether an event has occurred and adjusting the value of the tokens associated with the device based on that event. Other steps determine the status of a device, for example an on or off status of the device or the physical location of the device.

10 Claims, No Drawings

APPARATUSES, SYSTEMS AND METHODS FOR TRACKING NETWORK CONNECTED DEVICES

CROSS-REFERENCES TO RELATED PATENT APPLICATIONS

The present application claims benefit of U.S. Provisional Application No. 62/403,750 filed on 4 Oct. 2016 and U.S. Provisional Application No. 62/458,508 filed on 13 Apr. 2017, which are both herein incorporated by reference in their entireties.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND

Embodiments of the inventive subject matter relate to systems, apparatuses and methods for analyzing, tracking and reporting the various activities and statuses of devices and services across a computer enabled network such as the internet.

The Internet of Things (IoT) attempts to combine the offline and online/digital worlds with the use of smart devices and sensors which function in a variety of ways. These devices and sensors can be used to predict events and manage environments leading to greater efficiency that could save vast amounts of money in most industries.

Examples of IoT applications include the use of one or more devices and systems with smart cars, security systems, buildings, houses, environmental (temperature and lighting) control, robotics, irrigation systems and navigation. Yet other examples include the use of IoT devices and systems with smart cities, for example traffic management, waste management, structural health, noise control and reporting, mapping, and transportation systems. Other examples include environmental sensing such as early detection of earthquakes, forest fires, air quality issues and avalanche and landslide prevention. Some examples of water applications include devices for monitoring and managing water quality, leakage prevention, reservoir level management and flooding detection and prevention. Security and emergency examples include devices and systems for perimeter access control, radiation and liquid detection, explosive and hazardous gas detection, and emergency service management. Retail applications can include supply chain control, NFC payments, product management, and remote management of vending machines.

Examples of smart logistics include quality of shipment condition, item tracking, fleet tracking, geopositioning, and shipment/delivery management Some examples of industrial control include M2M applications, environment control such as HVAC control, temperature control, ozone presence, vehicle auto-diagnosis, and warehouse stock tracking.

Examples of agriculture applications include crop quality monitoring and/or crop irrigation, green house control, wine production control and monitoring and management of agriculture and park environments.

Some examples of farming application include animal farming offspring care, animal tracking, farm environment monitoring, farm toxic gas level monitoring, animal health care monitoring, and animal food history management.

Examples of smart home applications include temperature & humidity control, remote automation, lighting and ambiance control, energy efficiency appliances, intrusion detection systems, refrigeration, food management systems and fire systems as well as other safety and security systems and alarms.

Examples of health applications include personal monitoring such as fall detection, sports monitoring, patient monitoring, equipment monitoring, health and fitness monitoring and ultra-violet detection monitoring.

These examples are just a few among many, many other areas in which the embodiments of the inventive subject matter may be used with.

SUMMARY

The illustrated embodiments provide computer implemented methods, apparatuses, and systems that implement computer usable program code for analyzing a plurality of devices and services across a computer enabled network such as the internet so that an accounting can be provided with the use of tokens.

Several embodiments include methods of tracking one or more network connected devices. In some embodiments, the steps include determining whether the device is associated with an identifier. If the device does have an identifier, determining whether the identifier is associated with the device and if the device does not already have an identifier, associating an identifier with the device. The next step is assigning an amount of tokens to the device and its associated identifier and then determining an accounting of the tokens associated with the device. The amount of tokens assigned to any device or devices can be a block of tokens.

Other embodiments further include the steps of determining whether an event has occurred and adjusting the value of the tokens associated with the device based on that event. Other embodiments further include the step of determining that status of a device, for example an on or off status of the device or the physical location of the device.

Other embodiments include the identifier as a universally unique identifier, an IPv6 address, or any one or more other suitable identifiers in addition to these identifiers.

Other embodiments include more than one device instead of a single device. Other embodiments further include the steps of tracking messages from the devices and in yet other embodiments, the messages tracked include a number of tokens. Those tokens may be stored in a device or in multiple devices located remotely on the network. In other embodiments, when the status of the device indicates that the device has no more tokens associated with it, the device sends a message to a token assigning device requesting more units of tokens be associated with the device. Similarly, in other embodiments, when the status indicates that the device has a predetermined amount of tokens associated with it, the device sends a message to a token assigning device requesting more tokens be associated with the device. In this way, when a device is running low on tokens, it can request a refill of tokens from the token assigning device.

DETAILED DESCRIPTION OF THE DRAWINGS

Not applicable.

DETAILED DESCRIPTION OF THE EMBODIMENTS

According to embodiments of the claimed subject matter, various apparatuses, systems and methods systems for tracking IoT devices and more specifically embodiments for tracking IoT devices and providing an accounting of the activities of one or more IoT devices using tokens.

In accordance with exemplary implementations of the inventive subject matter a method is provided for assigning tokens to one or more IoT device in a system or systems of IoT devices.

Some typical IoT functions are determined at each level, such as a distinct or different level compared to other IoT functions. As an example, one function, an event, occurs in the physical world. A sensor or thing can monitor that event, for example an event of environmental temperature recorded at a specific time and place. Another example of a function is mining or detecting an event and recording a physical quality such as a rise in temperature. Logging is another function which stores the recorded collected by the device or thing after an event is observed, for example the recording of a rise in temperature. Other functions include communicating the stored data from the device to another device such as a router or storage repository. The analysis of the data associated with each device is another function as is the reporting function so that the data can be communicated to other devices. Devices have actions to begin a function such as a trigger of an actuator to activate a thermostat to regulate the temperature of the environment.

Functions can be used in steps to allow devices to send status data, observe external data and pass that data on to other devices.

In many of these embodiments, the raw data is aggregated and analyzed and then any derived information or knowledge is extracted. The processed data can then be acted upon. In some embodiments the processed date triggers an action, or it can be used in reporting through the dissemination of information or knowledge to interested parties. distributing various types of information across a distributed platform located on a network such as a closed network or any other type of network such as the internet.

Consumer devices that can be used with embodiments of the inventive subject matter include products with embedded sensors that allow the devices to sense their internal and external environments as well as communication components that give the devices the ability to communicate through networks of other devices including the devices found over the internet. Examples of use include smart cars, TVs, wearable technology, light bulbs, and air conditioners that have the ability to constantly or intermittently send data to other devices. Some of this data may be sent to the manufacturer, distributor and the consumer which may also be the owner and/or user of the device. The device manufacturers as well as consumers can use this data to identify when a replacement will be required or when an upgrade would be beneficial to either the manufacturer or the consumer. Another example is a smart refrigerator which is able to manage inventory within the refrigerator. These smart devices are able to reorder groceries on command or based on the historical patterns of the consumer and his or her family. Similarly, food and beverage products may also have sensors associated so that consumer's usage of those products can be monitored and that data can be reported. The devices can be allowed to not only sense and report, but perform other functions such as accounting.

In one embodiment, the devices as each assigned a universally unique identifier (also known as a "UUID") so that they may be identified and then individually tracked as to the statuses and actions associated with each device. In other embodiments, other identifiers may be used instead or in conjunction with the UUID that is assigned to each device or multiple devices. For example, an IPv6 address for individual devices may be used instead or in conjunction with the UUID. The assignment can be performed from one or more devices connected to the device being assigned a UUID over a direct connection or over a network such as the internet. Using the same or different control devices, the devices with unique UUID codes can then be assigned one or more tokens. Other suitable identifiers include an IP address, a MAC address, a subscriber identifier, a caller ID, a radio-frequency ID (RFID), a near field communication (NFC) ID, a Bluetooth ID, CPU information, OS information, and/or a random sequence.

In one example, a device can first be assigned a UUID by one control device and then loaded with tokens by another device. In another example, the UUID can be assigned to a device and it can be loaded with an amount of tokens by the same control device. An amount of token may be a fraction of a token or one or more tokens.

After any particular device is assigned a UUID or other suitable identifier, that device can communicate over the network using its UUID to identify itself. Similarly, once that same device has tokens, akin to the device having virtual currency associated with that device, it can communicate messages with one or more tokens attached to one or more messages. Some messages may include tokens while other communications or messages may not include tokens.

When the device is connected to a network such as the internet or a cloud network located within the internet or external to the internet, the device can send messages with tokens attached to and through other network devices such as routers and gateways. Whenever the message and attached token reaches a device on the network, a copy of the token is stored at each such device.

In these embodiments, when the device is out of tokens, the device can send a message to the device assigning tokens requesting more tokens be assigned to the now token-less device. Similarly, the device can request additional tokens when the device has a low number of tokens, for example when the number of tokens reaches a pre-established level of tokens, so that the device can be refilled or topped off with tokens. Tokens may be assigned individually to one or more devices or in some embodiments they may be assigned in blocks of tokens.

Examples of embodiments include devices that can be used at front entry doors to sense when and for how long a door is opened, devices that can measure levels and temperatures of water in water coolers, devices that can measure the level of light output in bulbs, with each device having tokens to attach to messages sent across a network. With some messages, one or more tokens are attached to the message, for instance a token to indicate usage of lumens in light emitted from a light emitting device so that the tokens can be used for an accounting and the end user can be billed for the amount of lumens used by the device in a specific period of time or by the amount of lumens emitted. For example, the tokens can be used as a virtual currency to charge the user for each lumen emitted from the light emitting device. When the device is out of tokens, the device is unable to emit light any longer until it is refilled with tokens from another device either locally or across the network.

In the aforementioned embodiments, a bill or invoice can be sent before the tokens are loaded on to the device or one or more bills can be sent after the tokens are used by the device (by attaching them to messages indicating usage of one or more features.) Reports may also be generating tracking where each token was recorded or checked in across one or more networks.

Additional applications include insurance monitoring and reporting and safety device reporting and monitoring. A vendor or end user can use the accounting methods and systems of the present embodiments to get information on where each token went including final destinations and each stopover and where each device was used as well as the state of the device being used in relation to the token.

What is claimed is:

1. A method for analyzing a plurality of devices and services across a computer enabled network to provide a virtual currency token based accounting, the method comprising:
   i. using a network connected control device to determine whether a network connected device is associated with an identifier; wherein when the network connected device does have an identifier, determining whether the identifier is associated with the network connected device; and wherein when the network connected device does not already have an identifier, associating an identifier with the network connected device by the network connected control device;
   ii. using the network connected control device to assign an amount of virtual currency tokens to the network connected device and its associated identifier; and
   iii. using the network connected device to store and monitor the amount of virtual currency tokens associated with the network connected device, wherein the network connected device can send messages with one or more virtual currency tokens attached to those messages to one or more other network connected devices,
   wherein when the monitoring indicates that the network connected device has no amount of virtual currency tokens associated with it, the network connected device can send a message to a network connected control device functioning as a token assigning device wherein the network connected device requests that a different amount of virtual currency tokens be associated with the network connected device; and wherein when the monitoring indicates that the network connected device has a predetermined amount of virtual currency tokens associated with it, the network connected device can send a message to a network connected control device functioning as a token assigning device requesting that a different amount of virtual currency tokens be associated with the network connected device.

2. The method of claim 1, further comprising the steps of:
   i. using the network connected device to determine whether an event has occurred; and
   ii. using the network connected device to adjust the amount of the virtual currency tokens associated with the network connected device based on the event.

3. The method of claim 1, wherein the identifier is a universally unique identifier.

4. The method of claim 1, wherein the identifier is selected from one or more from the following group: IP address, a MAC address, a subscriber identifier, a caller ID, a radio-frequency ID (RFID), a near field communication (NFC) ID, a Bluetooth ID, CPU information, OS information, and/or a random sequence.

5. The method of claim 1, wherein the network connected device is more than one network connected device.

6. The method of claim 1, further comprising the step of:
   i. using the network connected control device to track messages from the network connected device.

7. The method of claim 6, wherein the messages from the network connected device include an amount of virtual currency tokens.

8. The method of claim 7, wherein the messages are stored in a network connected device located remotely on the network.

9. The method of claim 8, wherein when the messages are received, a copy of the amount of virtual currency tokens is stored at the network connected device located remotely on the network.

10. The method of claim 1, wherein the virtual currency tokens are a block of virtual currency tokens.

\* \* \* \* \*